US012623395B2

(12) United States Patent
Kurihara et al.

(10) Patent No.: US 12,623,395 B2
(45) Date of Patent: May 12, 2026

(54) PREFORM FOR FORMING DOUBLE CONTAINER

(71) Applicant: YOSHINO KOGYOSHO CO., LTD., Tokyo (JP)

(72) Inventors: Tomoaki Kurihara, Tokyo (JP); Toshimasa Tanaka, Tokyo (JP); Takanori Suzuki, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 72 days.

(21) Appl. No.: 18/288,260

(22) PCT Filed: Apr. 26, 2022

(86) PCT No.: PCT/JP2022/018867
§ 371 (c)(1),
(2) Date: Oct. 25, 2023

(87) PCT Pub. No.: WO2022/230868
PCT Pub. Date: Nov. 3, 2022

(65) Prior Publication Data
US 2024/0217159 A1      Jul. 4, 2024

(30) Foreign Application Priority Data

Apr. 26, 2021      (JP) ................................. 2021-073768

(51) Int. Cl.
B29C 49/22        (2006.01)
B29C 49/00        (2006.01)

(52) U.S. Cl.
CPC ............ B29C 49/22 (2013.01); B29C 49/071 (2022.05); B29C 2949/0715 (2022.05)

(58) Field of Classification Search
None
See application file for complete search history.

(56) References Cited

U.S. PATENT DOCUMENTS

| | | | |
|---|---|---|---|
| 2008/0257847 A1 | 10/2008 | Van Hove et al. | |
| 2011/0024450 A1 | 2/2011 | Maas et al. | |
| 2014/0299565 A1 | 10/2014 | Maas | |

FOREIGN PATENT DOCUMENTS

| | | |
|---|---|---|
| JP | H10-180853 A | 7/1998 |
| JP | 2010-082916 A | 4/2010 |

(Continued)

OTHER PUBLICATIONS

Kuwabara JPH10180853A English Translation 1998 (Year: 1998).*

(Continued)

*Primary Examiner* — Jacob T Minskey
*Assistant Examiner* — Adrien J Bernard
(74) *Attorney, Agent, or Firm* — Oliff PLC

(57)      ABSTRACT

A preform for forming a double container configured to form a double container including an inner container and an outer container. The preform includes a bottomed cylindrical inner preform configured to form the inner container and a bottomed cylindrical outer preform configured to form the outer container. The inner preform is inserted into the outer preform, a longitudinal groove is formed in an inner peripheral surface of a mouth portion of the outer preform, an outside air introduction hole opens in a longitudinal groove, and a flange portion is provided in a mouth portion of the inner preform.

4 Claims, 6 Drawing Sheets

(56)     References Cited

FOREIGN PATENT DOCUMENTS

| | | | |
|---|---|---|---|
| JP | 2011-509219 | A | 3/2011 |
| JP | 2019-081604 | A | 5/2019 |
| JP | 2019-151339 | A | 9/2019 |
| JP | 2019-151352 | A | 9/2019 |
| JP | 2020-138751 | A | 9/2020 |
| JP | 2020-203468 | A | 12/2020 |
| JP | 2021-028153 | A | 2/2021 |

OTHER PUBLICATIONS

Mar. 5, 2025 Office Action issued in Japanese Patent Application No. 2021-073768.
Jun. 7, 2022 Search Report issued in International Patent Application No. PCT/JP2022/018867.
Oct. 29, 2024 Office Action issued in Japanese Patent Application No. 2021-073768.
Mar. 3, 2026 Notice of Allowance issued in Japanese Application No. 2025-083829.

* cited by examiner

PREFORM FOR FORMING DOUBLE CONTAINER

TECHNICAL FIELD

The present invention relates to a preform for forming a double container.

Priority is claimed on Japanese Patent Application No. 2021-073768, filed Apr. 26, 2021, the content of which is incorporated herein by reference.

BACKGROUND ART

A preform configured to form a double container including: an inner container configured to be deformed to reduce a capacity thereof according to reduction in contents accommodated; and an outer container in which an inner container is installed, and which is provided with an outside air introduction hole through which an outside air is introduced between the inner container and the outer container according to reduction in contents, includes: a bottomed cylindrical inner preform configured to form the inner container; and a bottomed cylindrical outer preform configured to form the outer container.

As such a preform for forming a double container, for example, as disclosed in the following Patent Document 1, a configuration in which an inner preform is fitted into an outer preform and a peeling agent layer is provided between an inner peripheral surface of the outer preform and an outer peripheral surface of the inner preform is known.

In the double container formed by the preform, when outside air is introduced between the inner container and the outer container through the outside air introduction hole according to reduction in contents, an outer peripheral surface of the inner container can be easily peeled off from an inner peripheral surface of the outer container.

CITATION LIST

Patent Document

[Patent Document 1]
Japanese Unexamined Patent Application, First Publication No. 2010-82916

SUMMARY OF INVENTION

Technical Problem

However, in the preform for forming a double container in the related art, since a peeling agent layer is provided between the inner peripheral surface of the outer preform and the outer peripheral surface of the inner preform, there is a problem that manufacturing is difficult.

In consideration of the above-mentioned circumstances, the present invention is directed to providing a preform for forming a double container in which an outer peripheral surface of an inner container is able to be easily peeled from an inner peripheral surface of an outer container according to reduction in contents even when a peeling agent layer is not provided.

Solution to Problem

The present invention employs the following means in order to solve the above-mentioned problems. That is, a first aspect of the present invention is a preform for forming a double container, the double container configured to form a double container including: an inner container configured to be deformed to reduce a capacity according to reduction in contacts accommodated; and an outer container in which the inner container is installed, and provided with an outside air introduction hole into which outside air is introduced between the inner container and the outer container according to reduction in the contents. The preform for forming a double container includes: a bottomed cylindrical inner preform configured to form the inner container, and a bottomed cylindrical outer preform configured to form the outer container. The inner preform is inserted into the outer preform in a state in which a mouth portion of the inner preform is fitted into a mouth portion of the outer preform. A longitudinal groove extending downward from an upper end opening edge of the outer preform is formed in an inner peripheral surface of the mouth portion of the outer preform. The outside air introduction hole opens in the longitudinal groove. A flange portion continuously extending over an entire length in a circumferential direction, abutting an upper end opening edge of the outer preform, and closing an upper end opening of the longitudinal groove is provided on the mouth portion of the inner preform.

In the present invention, the longitudinal groove extending downward from the upper end opening edge of the outer preform is formed in the inner peripheral surface of the mouth portion of the outer preform, and the outside air introduction hole opens in the longitudinal groove. Accordingly, even in a state in which the mouth portion of the inner preform is fitted into the mouth portion of the outer preform and relative movement between the outer preform and the inner preform is curbed, outside air passes through the longitudinal groove when the outside air is introduced between the inner container and the outer container through the outside air introduction hole. Accordingly, even when a peeling agent layer is not provided, the outer peripheral surface of the inner container can be peeled off from the inner peripheral surface of the outer container according to reduction in contents.

The longitudinal groove extends downward from the upper end opening edge of the outer preform. Accordingly, the longitudinal groove can be easily provided in the inner peripheral surface of the outer preform without complicating the structure of the molding die.

A flange portion continuously extending over the entire length in the circumferential direction and abutting the upper end opening edge of the outer preform is provided on the mouth portion of the inner preform. Accordingly, relative movement between the outer preform and the inner preform can be reliably suppressed.

The flange portion closes the upper end opening of the longitudinal groove. Accordingly, according to reduction in contents, a portion into which the outside air enters between the inner container and the outer container can be limited to the outside air introduction hole. Accordingly, it becomes easier to maintain the momentum when the outside air enters between the inner container and the outer container, the outer peripheral surface of the inner container can be reliably easily peeled off from the inner peripheral surface of the outer container, and it is possible to easily make the contracted deformation state of the inner container into a desired shape. As a result, it is possible to reduce the remaining amount of contents.

A second aspect of the present invention is the preform for forming a double container of the above-mentioned first aspect in which, when seen in a longitudinal cross-sectional view along a central axis of the inner preform, an inner peripheral surface and an outer peripheral surface of the mouth portion of the inner preform extends along the central axis.

In this case, the inner peripheral surface and the outer peripheral surface of the mouth portion of the inner preform extend along the central axis when seen in a longitudinal cross-sectional view along a central axis of the inner preform. Accordingly, relative movement between the outer preform and the inner preform can be reliably suppressed.

A third aspect of the present invention is the preform for forming a double container of the above-mentioned first or second aspect in which a projection portion protruding outward in a radial direction, continuously extending over the entire length in the circumferential direction, and pressed against the inner peripheral surface of the mouth portion of the outer preform, is provided in the outer peripheral surface of the mouth portion of the inner preform.

In this case, the projection portion pressed against the inner peripheral surface of the mouth portion of the outer preform is provided on the outer peripheral surface of the mouth portion of the inner preform. Accordingly, relative movement between the outer preform and the inner preform can be reliably suppressed.

A fourth aspect of the present invention is the preform for forming a double container of the above-mentioned first to third aspects in which a diffusion gap continuously extending over the entire length in the circumferential direction, is provided between a connecting portion to a lower surface of the flange portion in the outer peripheral surface of the inner preform and a connecting portion to the inner peripheral surface and the upper end opening edge of the outer preform.

In this case, the diffusion gap is provided between the connecting portion to the lower surface of the flange portion of the outer peripheral surface of the inner preform and the connecting portion to the inner peripheral surface and the upper end opening edge of the outer preform. Accordingly, as the outside air introduced between the inner container and the outer container through the outside air introduction hole flows through the diffusion gap according to reduction in contents, it spreads more easily over the entire length in the circumferential direction in the mouth portion of the double container, and the contracted deformation state of the inner container can be easily made into a desired shape.

Effects of Invention

According to the present invention, even when a peeling agent layer is not provided, the outer peripheral surface of the inner container can be easily peeled off from the inner peripheral surface of the outer container according to reduction in contents.

DESCRIPTION OF EMBODIMENTS

Hereinafter, a preform for forming a double container according to a first embodiment will be described with reference to the accompanying drawings. As shown in FIG. 1 to FIG. 4, a preform 1 for forming a double container is used to form a double container X including an inner container X1 deformed to reduce a capacity thereof according to reduction in contents accommodated and an outer container X2, in which the inner container X1 is installed, is provided with an outside air introduction hole 13 configured to introduce outside air between the inner container X1 and the outer container X2 according to reduction in contents.

The double container X is formed by blow-molding the preform 1 for forming a double container. In the double container X, the inner container X1 is highly flexible and is provided so as to be separated from an inner surface of the outer container X2.

Figure 1:
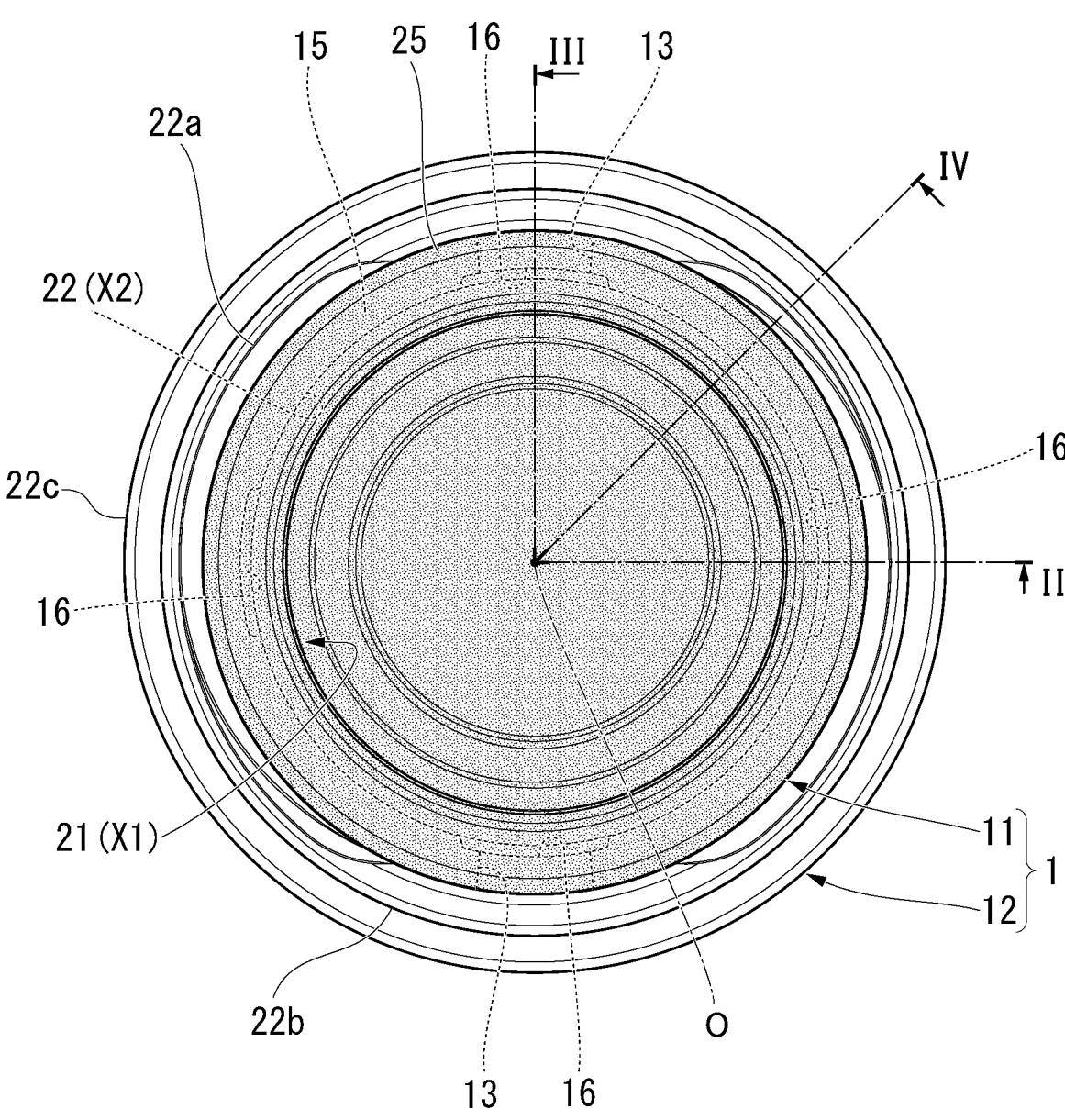
FIG. 1 is a plan view of a preform for forming a double container shown as an embodiment.

The preform 1 for forming a double container includes a bottomed cylindrical inner preform 11 configured to form the inner container X1, and a bottomed cylindrical outer preform 12 configured to form the outer container X2. In FIG. 1, the inner preform 11 is hatched.

Figure 2:
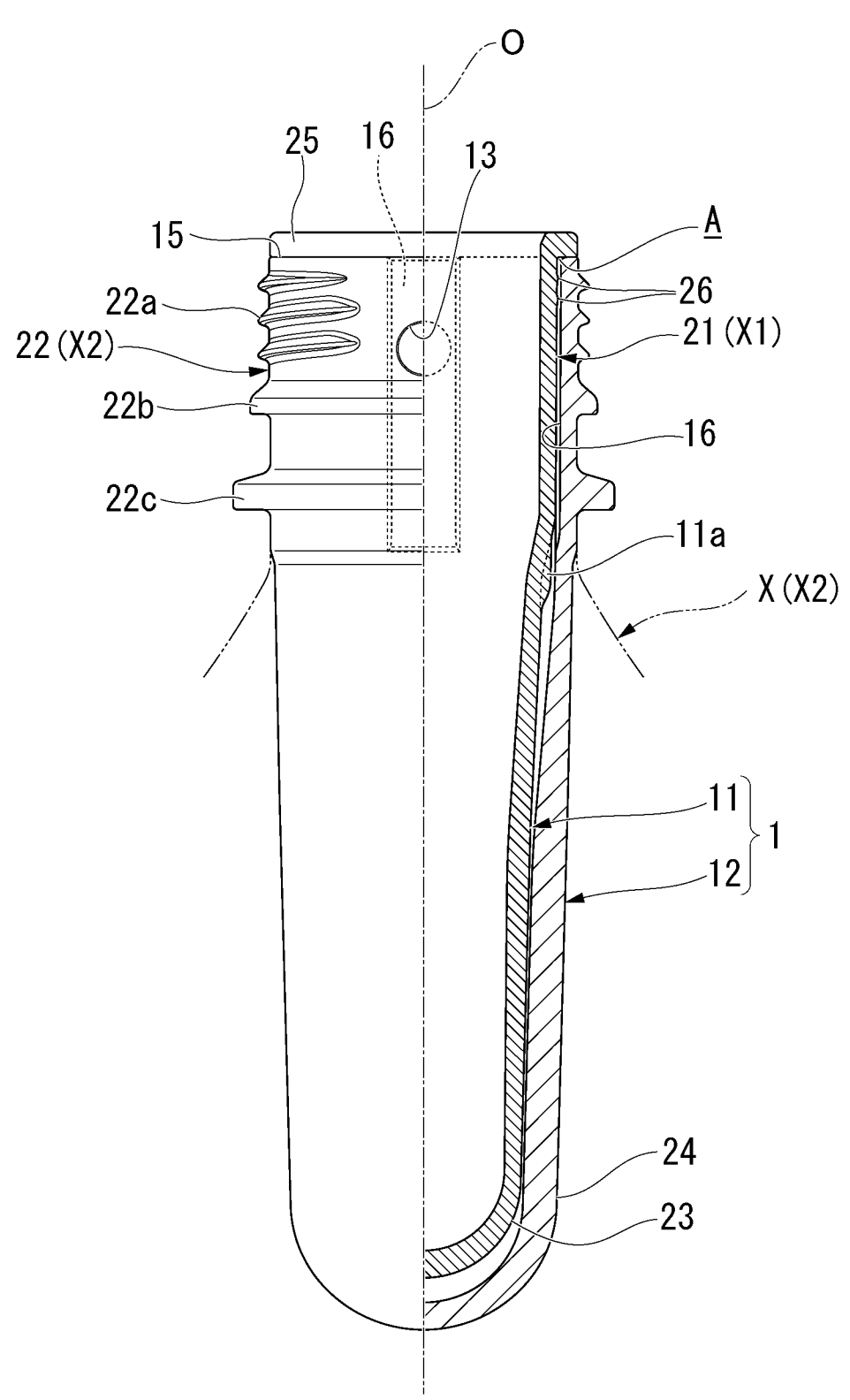
FIG. 2 is a half longitudinal cross-sectional view including a cross section along an arrow II according to a first embodiment of FIG. 1.

As shown in FIG. 2, a mouth portion (hereinafter, referred to as an inner mouth portion) 21 of the inner preform 11 is inserted into a mouth portion (hereinafter, referred to as an outer mouth portion) 22 of the outer preform 12, and a bottom portion (hereinafter, referred to as an inner bottom portion) 23 of the inner preform 11 is inserted into a bottom portion (hereinafter, referred to as an outer bottom portion) 24 of the outer preform 12.

The inner preform 11 and the outer preform 12 are disposed coaxially with a common axis. Hereinafter, the common axis is referred to as a central axis O, the inner mouth portion 21 side and the outer mouth portion 22 side along the central axis O are referred to as upper sides, and the inner bottom portion 23 side and the outer bottom portion 24 side along the central axis O are referred to as lower sides. When seen in an upward/downward direction, a direction crossing the central axis O is referred to as a radial direction, and a direction around the central axis O is referred to as a circumferential direction.

Materials of the inner preform 11 and the outer preform 12 are synthetic resin materials, which may be the same material or different materials. As an example of the synthetic resin material, for example, polyethylene terephthalate (PET), polypropylene (PP), polyethylene (PE), polyamide (Nylon), ethylene-vinyl alcohol copolymer (EVOH), and the like, are exemplified.

Figure 4:
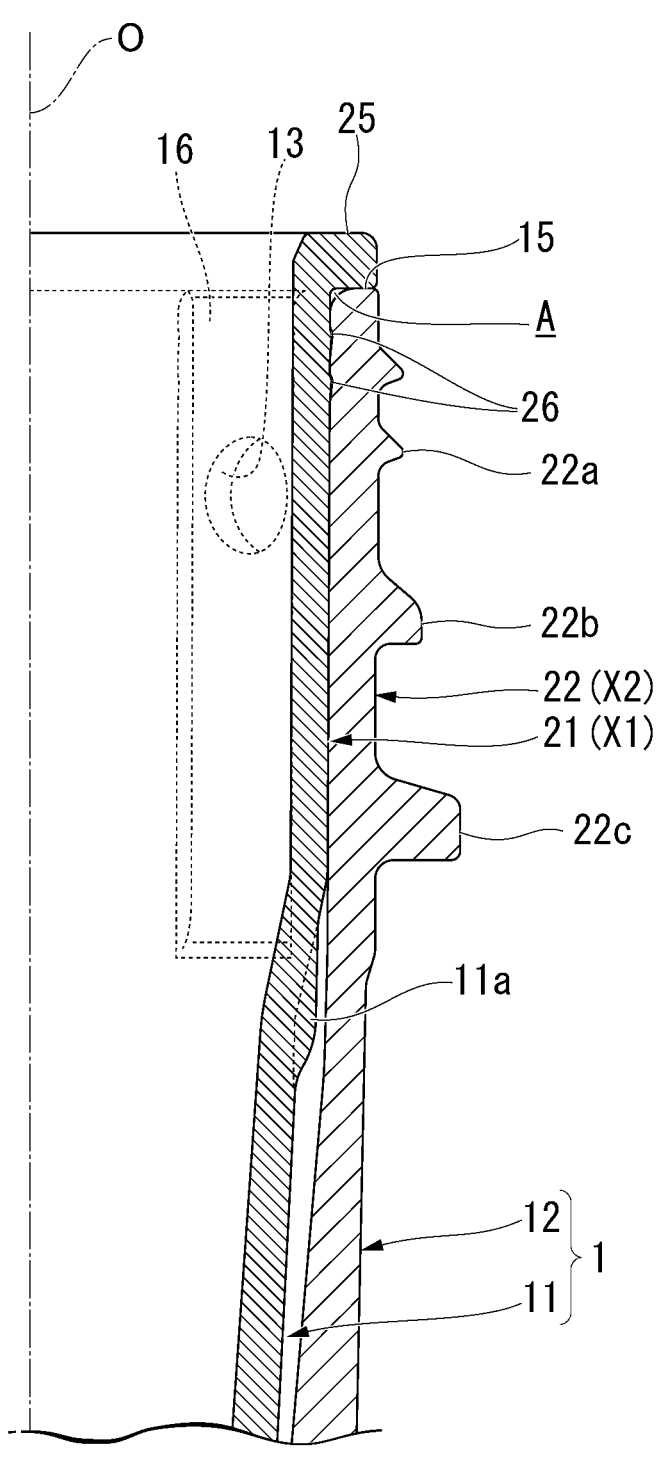
FIG. 4 is a cross-sectional view along an arrow IV according to the first embodiment of FIG. 1.

As shown in FIG. 4, the inner mouth portion 21 is fitted inside the outer mouth portion 22. An outer peripheral surface of the inner mouth portion 21 abuts an inner peripheral surface of the outer mouth portion 22 throughout the entire length in the upward/downward direction.

As shown in FIG. 2, a gap is provided at a portion located below the inner mouth portion 21 and the outer mouth portion 22 between the outer peripheral surface of the inner preform 11 and the inner peripheral surface of the outer preform 12 throughout the entire length in the upward/downward direction.

A male screw portion 22a on which a cap (not shown) is screwed, a protrusion to be sealed 22b onto which a circumferential wall portion of the cap (not shown) is fitted, and a neck ring 22c are formed on an outer peripheral surface of the outer mouth portion 22 from above toward below in sequence.

Further, the cap may be undercut-fitted onto the outer mouth portion 22.

The protrusion to be sealed 22b and the neck ring 22c protrude outward from the outer mouth portion 22 in the radial direction and continuously extend throughout the entire length in the circumferential direction. A space between the outer peripheral surface of the protrusion to be sealed 22b and the inner peripheral surface of the circumferential wall portion of the cap (not shown) is hermetically sealed. An outer diameter of the neck ring 22c is greater than an outer diameter of the protrusion to be sealed 22b. The neck ring 22c is located below a circumferential wall portion of the cap (not shown).

The above-mentioned outside air introduction hole 13 is formed in the outer mouth portion 22. The outside air introduction hole 13 is located on the outermost side of the protrusion to be sealed 22b in the radial direction, and located above a seal surface continuously extending over the entire length in the circumferential direction. Positions of lower portions of the outside air introduction hole 13 and the male screw portion 22a in the upward/downward direction are the same as each other. Here, the male screw portion 22a extends intermittently in the circumferential direction, and the outside air introduction hole 13 is provided in an intermittent portion of the male screw portion 22a in the circumferential direction.

A longitudinal groove 16 extending downward from an upper end opening edge 15 of the outer preform 12 is formed in an inner peripheral surface of the outer mouth portion 22. The outside air introduction hole 13 is open in the longitudinal groove 16. A lower end portion of the longitudinal groove 16 is located below the neck ring 22c.

As shown in FIG. 1, each of the outside air introduction hole 13 and the longitudinal groove 16 is provided in plurality at the same interval in the circumferential direction. In the example shown, the longitudinal grooves 16 are provided at four places at an interval of 90° about the central axis O when seen in the upward/downward direction. In the four longitudinal grooves 16, each of the two longitudinal grooves 16 facing each other in the radial direction has the outside air introduction hole 13 that is open. Further, the outside air introduction holes 13 may be open in all the longitudinal grooves 16, or the plurality of outside air introduction holes 13 may be open in one longitudinal groove 16.

Figure 3:
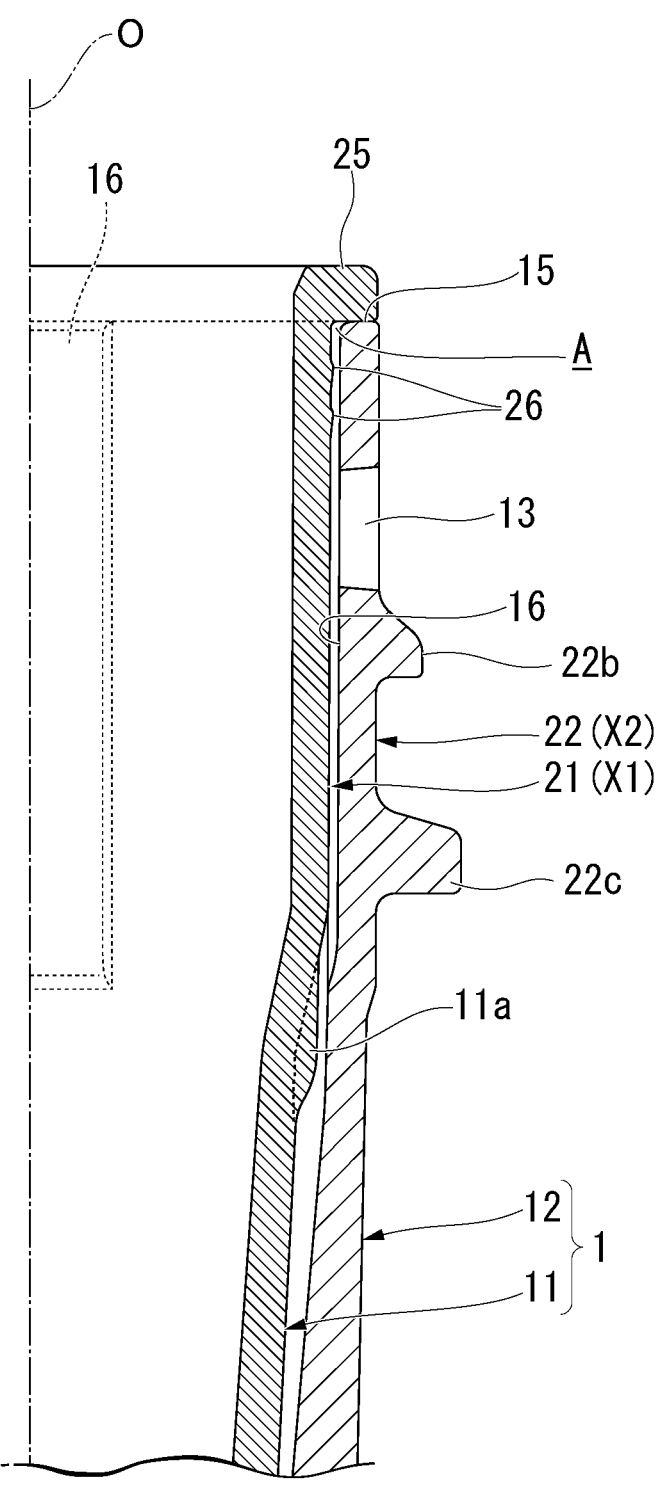
FIG. 3 is a cross-sectional view along an arrow III according to the first embodiment of FIG. 1.

A flange portion 25 continuously extending over the entire length in the circumferential direction and abutting the upper end opening edge 15 of the outer preform 12 is provided in the inner mouth portion 21. As shown in FIG. 3, the flange portion 25 closes an upper end opening of the longitudinal groove 16.

As shown in FIG. 4, a projection portion 26 protruding outward in the radial direction, continuously extending over the entire length in the circumferential direction and press-fitted into an inner peripheral surface of the outer mouth portion 22 is provided in an outer peripheral surface of the inner mouth portion 21. The plurality of projection portions 26 are provided at an interval in the upward/downward direction. As shown in FIG. 3, the projection portion 26 is located above the outside air introduction hole 13 of the outer mouth portion 22. Further, the projection portion 26 may not be provided.

The inner peripheral surface and the outer peripheral surface of the inner mouth portion 21 extend along the central axis O when seen in a longitudinal cross-sectional view along the central axis O. In the inner peripheral surface and the outer peripheral surface of the inner mouth portion 21, at least the inner peripheral surface extends in parallel with the central axis O. In the example shown, the inner peripheral surface and the outer peripheral surface of the inner mouth portion 21 extend in parallel with the central axis O. "Parallel" disclosed herein includes a draft angle from a molding die.

The inner mouth portion 21 is a portion of the inner preform 11 including the same position in the upward/downward direction in the outer preform 12 with respect to the lower surface of the neck ring 22c and located above the lower surface. In the preform 1 for forming a double container, the portion that includes the same position in the upward/downward direction and is located above the lower surface of the neck ring 22c is a portion that does not change shape before and after blow molding.

In the outer peripheral surface of the inner preform 11, a plurality of ribs 11a protruding outward in the radial direction, adjacent to an inner peripheral surface of the outer preform 12 are formed at a portion continuous with a lower end of the inner mouth portion 21 at an interval in the circumferential direction. The ribs 11a maintain a communication state in the upward/downward direction between the outer peripheral surface of the inner container X1 and the inner peripheral surface of the outer container X2 in the double container X.

Further, the ribs 11a may be a portion whose shape does not change before and after blow molding, or may be a portion that contacts the inner peripheral surface of the outer container X2 formed by the outer preform 12 after blow molding.

A diffusion gap A continuously extending over the entire length in the circumferential direction is provided between a connecting portion to a lower surface of the flange portion 25 in the outer peripheral surface of the inner preform 11 and a connecting portion to the inner peripheral surface and the upper end opening edge 15 of the outer preform 12. The diffusion gap A opens in the longitudinal groove 16.

The connecting portion to the lower surface of the flange portion 25 in the outer peripheral surface of the inner preform 11 is formed in a curved surface shape recessed inward in the radial direction. The connecting portion to the inner peripheral surface and the upper end opening edge 15 of the outer preform 12 is formed in a curved surface shape protruding inward in the radial direction.

As described above, according to the preform 1 for forming a double container by the embodiment, the longitudinal groove 16 extending downward from the upper end opening edge 15 of the outer preform 12 is formed in the inner peripheral surface of the outer mouth portion 22, and the outside air introduction hole 13 opens in the longitudinal groove 16. Accordingly, even in a state in which the inner mouth portion 21 is fitted into the outer mouth portion 22 and relative movement between the outer preform 12 and the inner preform 11 is suppressed, the outside air passes through the longitudinal groove 16 when the outside air is introduced between the inner container X1 and the outer container X2 through the outside air introduction hole 13. Accordingly, even when the peeling agent layer is not provided, the outer peripheral surface of the inner container X1 can be easily peeled off from the inner peripheral surface of the outer container X2 according to reduction in contents.

The longitudinal groove 16 extends downward from the upper end opening edge 15 of the outer preform 12. Accordingly, the longitudinal groove 16 can be easily provided on the inner peripheral surface of the outer preform 12 without complicating the structure of the molding die.

The flange portion 25 continuously extending over the entire length in the circumferential direction and abutting the upper end opening edge 15 of the outer preform 12 is provided in the inner mouth portion 21. Accordingly, relative movement between the outer preform 12 and the inner preform 11 can be reliably suppressed.

The flange portion 25 closes the upper end opening of the longitudinal groove 16. Accordingly, a portion into which the outside air enters between the inner container X1 and the outer container X2 can be limited to the outside air introduction hole 13 according to reduction in contents. Accordingly, it becomes easier to maintain the momentum when the outside air enters between the inner container X1 and the outer container X2, it becomes easier to peel off the outer peripheral surface of the inner container X1 from the inner peripheral surface of the outer container X2, and at the same time, it is possible to make the contracted deformation shape of the inner container X1 easy to achieve the desired shape. As a result, it is possible to suppress the remaining amount of the contents.

The inner peripheral surface and the outer peripheral surface of the inner mouth portion 21 extend along the central axis O when seen in a longitudinal cross-sectional view along the central axis O. Accordingly, relative movement between the outer preform 12 and the inner preform 11 can be reliably suppressed.

The projection portion 26 pressed against the inner peripheral surface of the outer mouth portion 22 is provided on the outer peripheral surface of the inner mouth portion 21. Accordingly, relative movement between the outer preform 12 and the inner preform 11 can be reliably suppressed.

The diffusion gap A is provided between the connecting portion to the lower surface of the flange portion 25 in the outer peripheral surface of the inner preform 11 and the connecting portion to the inner peripheral surface and the upper end opening edge 15 of the outer preform 12. Accordingly, as the outside air introduced between the inner container X1 and the outer container X2 through the outside air introduction hole 13 flows through the diffusion gap A according to reduction in contents, it becomes easy to spread over the entire length in the circumferential direction in the mouth portion of the double container X, and it is possible to easily make the contracted deformation shape of the inner container X1 into the desired shape.

Figure 5:
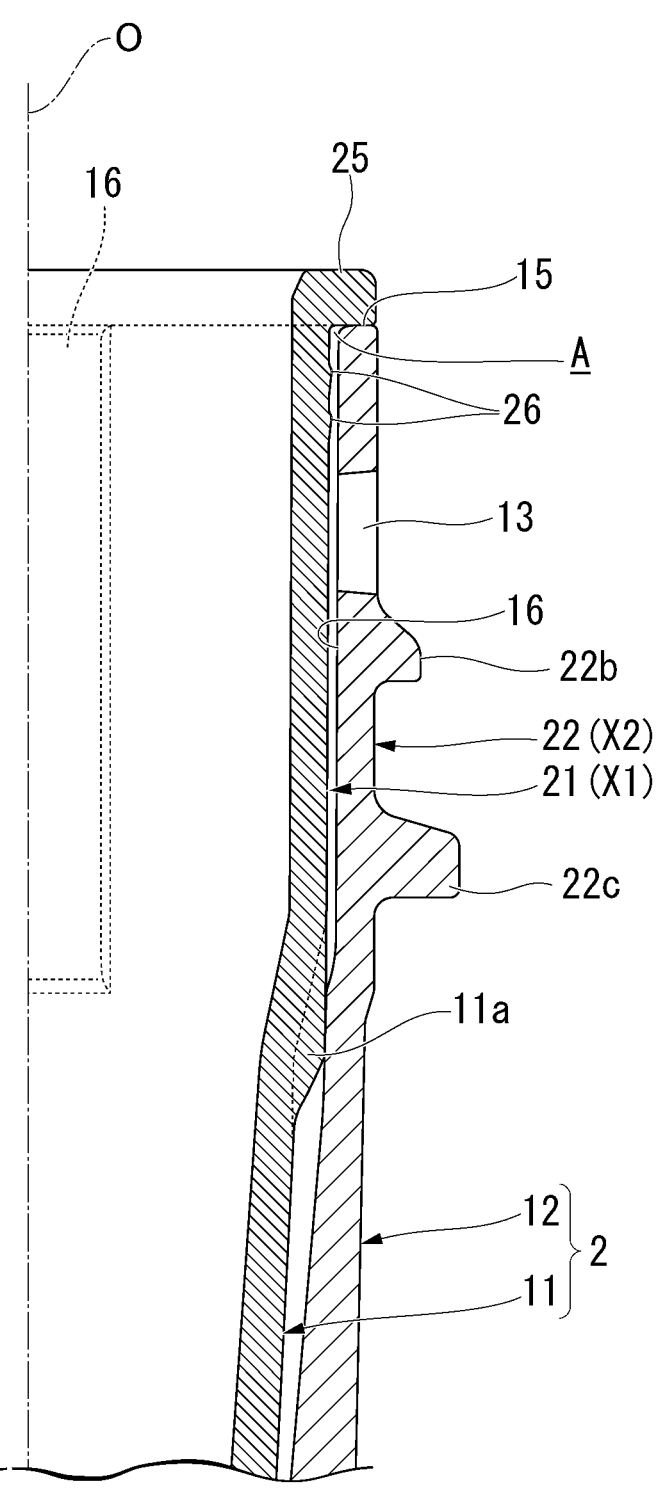
FIG. 5 is a cross-sectional view along an arrow III according to a second embodiment of FIG. 1.
Figure 6:
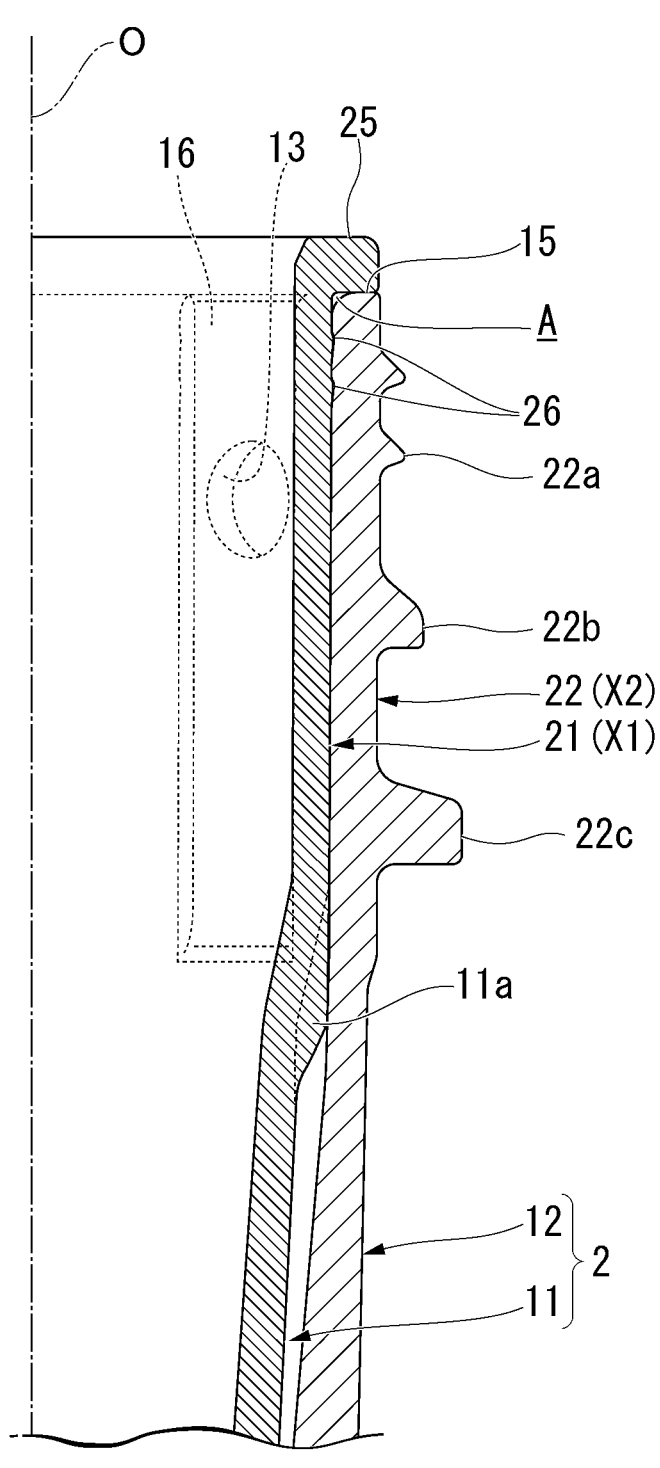
FIG. 6 is a cross-sectional view along an arrow IV according to the second embodiment.

Next, a preform 1 for forming a double container according to a second embodiment will be described with reference to FIG. 5 and FIG. 6.

Further, in the second embodiment, parts that are the same as the components in the first embodiment are designated by the same reference numerals, descriptions thereof are omitted, and only different points will be described.

In the embodiment, the ribs 11a abut the inner peripheral surface of the outer preform 12. Positions of upper end portions of the ribs 11a and a lower end portion of the longitudinal groove 16 in the upward/downward direction are the same as each other. Lower end portions of the ribs 11a are located below the longitudinal groove 16.

In the preform 1 for forming a double container, an abutting portion of the ribs 11a abutting the inner peripheral surface of the outer preform 12 is located at a boundary between a portion whose shape does not change before and after blow molding and a portion extending upon blow molding.

Further, in the preform 1 for forming a double container, the inner mouth portion 21, and the abutting portion of the ribs 11a and the portion where positions in the upward/downward direction are the same may be the portion whose shape does not change before and after blow molding, and the portion located below the abutting portion of the ribs 11a may be the portion extending upon blow molding.

As described above, according to the preform 1 for forming a double container by the embodiment, even when the peeling agent layer is not provided like the preform 1 for forming a double container, the outer peripheral surface of the inner container X1 can be easily peeled off from the inner peripheral surface of the outer container X2 according to reduction in contents.

Further, the technical scope of the present invention is not particularly limited to the above-mentioned embodiment, and various modifications may be made without departing from the spirit of the present invention.

The diffusion gap A may not be provided between the connecting portion to the lower surface of the flange portion 25 in the outer peripheral surface of the inner preform 11 and the connecting portion to the inner peripheral surface and the upper end opening edge 15 of the outer preform 12.

In addition, the components in the embodiment can be appropriately replaced with well-known components, and the embodiment and the variant may be combined as appropriate without departing from the spirit of the present invention,

INDUSTRIAL APPLICABILITY

According to the present invention, even when the peeling agent layer is not provided, the outer peripheral surface of the inner container can be easily peeled off from the inner peripheral surface of the outer container according to reduction in contents.

REFERENCE SIGNS LIST

1, 2 Preform for forming double container
11 Inner preform
12 Outer preform
13 Outside air introduction hole
15 Upper end opening edge
16 Longitudinal groove
21 Inner mouth portion (mouth portion of inner preform)
22 Outer mouth portion (mouth portion of outer preform)
25 Flange portion
26 Projection portion
A Diffusion gap
O Central axis
X Double container
X1 Inner container
X2 Outer container

The invention claimed is:

1. A preform for forming a double container, the preform configured to form a double container including:
   an inner container configured to be deformed to reduce a capacity according to reduction in contents accommodated; and
   an outer container in which the inner container is installed, and which is provided with an outside air introduction hole into which an outside air is introduced between the inner container and the outer container according to reduction in the contents,
   the preform comprising:
      a bottomed cylindrical inner preform configured to form the inner container; and a bottomed cylindrical outer preform configured to form the outer container, wherein the inner preform is inserted into the outer preform in a state in which a mouth portion of the inner preform is fitted into a mouth portion of the outer preform, a longitudinal groove, extending downward from an upper end opening edge of the outer preform, is formed in an inner peripheral surface of the mouth portion of the outer preform, the outside air introduction hole opens in the longitudinal groove, a flange portion continuously extending over an entire length in a circumferential direction, abutting the upper end opening edge of the outer preform over the entire length in a circumferential direction, and closing an upper end opening of the longitudinal groove, is provided on the mouth portion of the inner preform, and the outside air introduction hole is disposed below and apart from the upper end opening edge of the outer preform.

2. The preform for forming a double container according to claim 1, wherein when seen in a longitudinal cross-sectional view along a central axis of the inner preform, an inner peripheral surface and an outer peripheral surface of the mouth portion of the inner preform extend along the central axis.

3. The preform for forming a double container according to claim 1, wherein a projection portion protruding outward in a radial direction, continuously extending over the entire length in the circumferential direction, and pressed against the inner peripheral surface of the mouth portion of the outer preform, is provided in an outer peripheral surface of the mouth portion of the inner preform.

4. The preform for forming a double container according to claim 1, wherein a diffusion gap continuously extending over the entire length in the circumferential direction, is provided between a connecting portion to a lower surface of the flange portion in an outer peripheral surface of the inner preform and a connecting portion to the inner peripheral surface and the upper end opening edge of the outer preform.

\* \* \* \* \*